L. V. FICHET.
Oil Still.
No. 53,964. Patented Apr. 17, 1866.
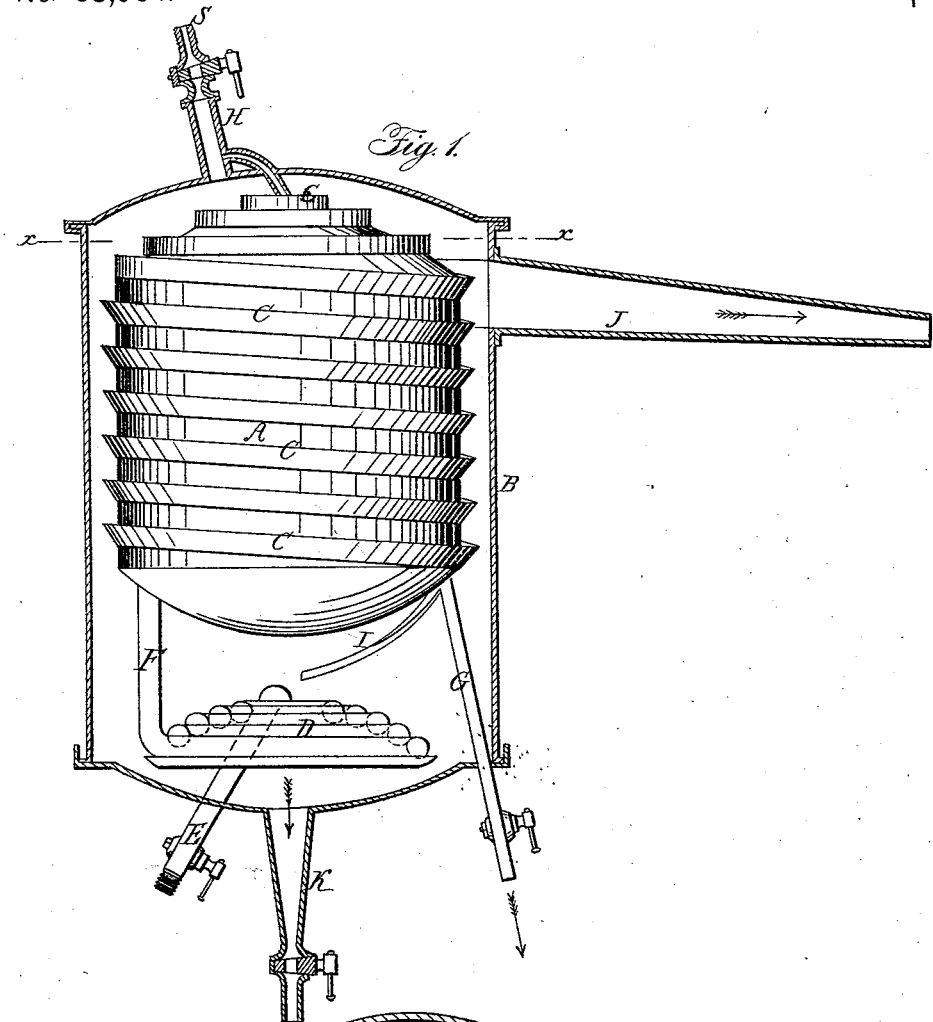
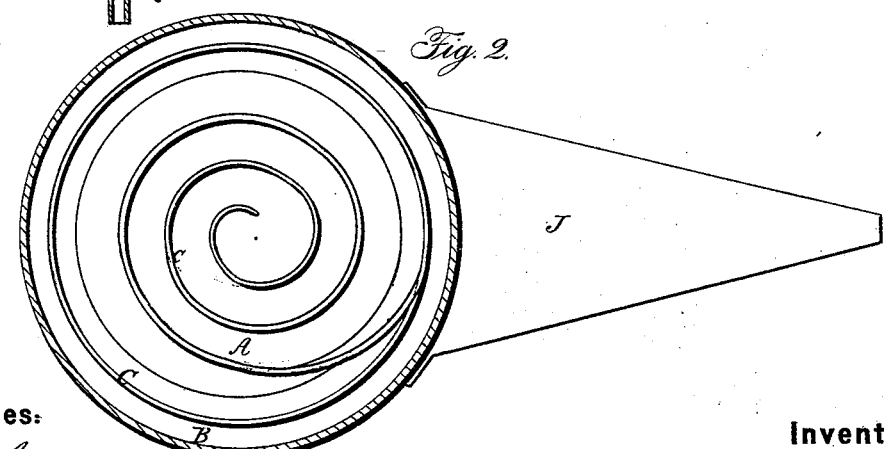
Witnesses:
Inventor:

United States Patent Office.

L. V. FICHET, OF NEW YORK, N. Y.

IMPROVED APPARATUS FOR DISTILLING PETROLEUM.

Specification forming part of Letters Patent No. 53,964, dated April 17, 1866.

*To all whom it may concern:*

Be it known that I, L. V. FICHET, of the city, county, and State of New York, have invented a new and Improved Apparatus for Distilling Petroleum and Other Liquids; and I do hereby declare that the following is a full, clear, and exact description thereof, which will enable others skilled in the art to make and use the same, reference being had to the accompanying drawings, forming part of this specification, in which—

Figure 1 represents a vertical section of this invention. Fig. 2 is a horizontal section of the same, the lines $x\ x$, Fig. 1, indicating the plane of section.

Similar letters of reference indicate like parts.

This invention relates to an apparatus composed of a hollow drum and steam-coil, which are heated by superheated steam and surrounded or covered by a suitable jacket, in combination with a helical trough commencing on the top of the steam drum and extending down to its bottom in such a manner that crude petroleum or other liquids let into the top end of the helical trough are gradually heated and partially evaporated, and those parts of said liquids which reach the bottom end of the troughs in a liquid state drip down upon the highly-heated steam-coil, where they constantly flash into vapors, and the distillation of petroleum or other liquids can thus be conducted without interruption and without danger of an explosion or conflagration.

A represents a hollow drum, made of copper or any other suitable material, and secured in the interior of the cylindrical jacket B. Said drum is firmly closed on all sides, and its exterior surface is occupied by a helical trough, C, which commences on its top and runs down to its bottom edge, as clearly shown in Fig. 1 of the drawings.

D is a steam-coil, which occupies the bottom part of the jacket B, and to which superheated steam is admitted through the pipe E. The steam discharging from the coil D passes through the pipe F into the drum A, which is provided with an exhaust-pipe to let out the surplus steam or the water of condensation, which forms whenever the apparatus is permitted to cool off.

The crude petroleum or other liquid to be distilled is let on the top end of the helical trough through the pipe H, which may be made to connect with a supply-tank, and in passing down through said trough the light or more volatile constituents are vaporized, and the heavy or less volatile parts of the liquid are highly heated, and discharge from the trough over the apron I on the steam-coil D. This coil, being highly heated, causes the liquid coming in contact with its external surface to flash into vapor or steam instantaneously, and all these vapors escape through the goose-neck J.

Those parts of the liquid which cannot be formed into vapor collect on the bottom of the jacket B, where they are removed through the trap K.

By these means the distillation of crude petroleum or other liquid can be effected with comparatively little labor or expense of fuel, and without interruption or danger of an explosion, and the process can be stopped at any moment and taken up again or continued without much loss.

The entire apparatus is compact, readily kept in order, and it can be operated by persons of ordinary skill and without previous practice in the distillation of such liquids as petroleum.

The vapors, on emanating from the goose-neck, are condensed and separated according to their specific gravity.

I am aware that the device of a tube as a means of conveying heat contained in a trough containing the liquid to be distilled is not new, and I do not claim that appliance as any part of my plan.

What I claim as new, and desire to secure by Letters Patent, is—

The drum A, with the helical channel or trough C, in combination with the steam-coil D and jacket B, constructed and operating substantially as and for the purpose described.

L. V. FICHET.

Witnesses:
M. M. LIVINGSTON,
W. HAUFF.